United States Patent
Zori et al.

(10) Patent No.: US 10,565,327 B1
(45) Date of Patent: Feb. 18, 2020

(54) FROZEN GUST ANALYSIS VIA TIME-TRANSFORMATION PITCH-CHANGE MODEL AND HARMONIC SOLUTION METHOD

(71) Applicant: Ansys, Inc., Canonsburg, PA (US)

(72) Inventors: Laith Zori, Clifton, VA (US); Paul Galpin, Kitchener (CA); Rubens Campregher, Waterloo (CA); Juan Carlos Morales, Waterloo (CA); Philippe Godin, Waterloo (CA)

(73) Assignee: Ansys, Inc., Canonsburg, PA (US)

( * ) Notice: Subject to any disclaimer, the term of this patent is extended or adjusted under 35 U.S.C. 154(b) by 701 days.

(21) Appl. No.: 14/994,214

(22) Filed: Jan. 13, 2016

Related U.S. Application Data

(60) Provisional application No. 62/102,624, filed on Jan. 13, 2015.

(51) Int. Cl.
*G06F 17/50* (2006.01)
*F04D 27/00* (2006.01)

(52) U.S. Cl.
CPC ....... *G06F 17/5009* (2013.01); *F04D 27/001* (2013.01); *F05D 2260/81* (2013.01)

(58) Field of Classification Search
CPC .......... F01D 21/003; F01D 9/041; F01D 5/12; G06F 17/10; G06F 17/5009; F04D 29/284; F04D 27/001; F04D 29/444; F05D 2220/30; F05D 2260/81
USPC .......................................................... 703/2
See application file for complete search history.

(56) References Cited

PUBLICATIONS

Connell, Stuart, et al. "A comparison of advanced numerical techniques to model transient flow in turbomachinery blade rows." ASME 2011 Turbo Expo: Turbine Technical Conference and Exposition. American Society of Mechanical Engineers, 2011. pp. 1-10.*
Fan, S., and B. Lakshminarayana. "Computation and Simulation of Wake-Generated Unsteady Pressure and Boundary Layers in Cascades: Part 1—Description of the Approach and Validation." ASME 1994 International Gas Turbine and Aeroengine Congress and Exposition. American Society of Mechanical Engineers, 1994. pp. 1-16.*

(Continued)

*Primary Examiner* — Kamini S Shah
*Assistant Examiner* — John E Johansen
(74) *Attorney, Agent, or Firm* — Jones Day

(57) ABSTRACT

Systems and methods are provided for modeling fluid flow in a turbomachine. A specification of a system including first and second blade rows is received. A wake profile from the first blade row is imposed on the second blade row to approximate an influence of the first blade row on the second blade row. Governing flow equations for the fluid flow in the second blade row are transformed in time. Flow variables of the transformed governing flow equations are represented as a Fourier series, and the Fourier series representation is substituted into the transformed governing flow equations to obtain a modified form of the transformed governing flow equations. A pseudo-time term is introduced into the modified form of the transformed governing flow equations. The modified form of the transformed governing flow equations is solved using the steady-state solution method to model the fluid flow in the second blade row.

20 Claims, 8 Drawing Sheets

(56) References Cited

PUBLICATIONS

Des Francs, Gérard Colas, Jean-Paul Hugonin, and Jiří Čtyroký. "Mode solvers for very thin long-range plasmonic waveguides." Optical and Quantum Electronics 42.8 (Published online 2010). pp. 1-14.*

Giles, Michael B. "Calculation of unsteady wake/rotor interaction." Journal of Propulsion and Power 4.4 (1988). pp. 356-362.*

Connell, Stuart, et al. "A comparison of advanced numerical techniques to model transient flow in turbomachinery blade rows." ASME 2011 Turbo Expo: Turbine Technical Conference and Exposition. American Society of Mechanical Engineers, 2011. pp. 1-10. (Year: 2011).*

Fan, S., and B. Lakshminarayana. "Computation and Simulation of Wake-Generated Unsteady Pressure and Boundary Layers in Cascades: Part 1 Description of the Approach and Validation." ASME 1994 International Gas Turbine and Aeroengine Congress and Exposition. pp. 1-16. (Year: 1994).*

Des Francs, Gérard Colas, Jean-Paul Hugonin, and Jiří Čtyroký. "Mode solvers for very thin long-range plasmonic waveguides." Optical and Quantum Electronics 42.8 (Published online 2010). pp. 1-14. (Year: 2010).*

Giles, Michael B. "Calculation of unsteady wake/rotor interaction." Journal of Propulsion and Power 4.4 (1988). pp. 356-362. (Year: 1988).*

* cited by examiner

FROZEN GUST APPROXIMATION

WAKE FROM UPSTREAM ROW

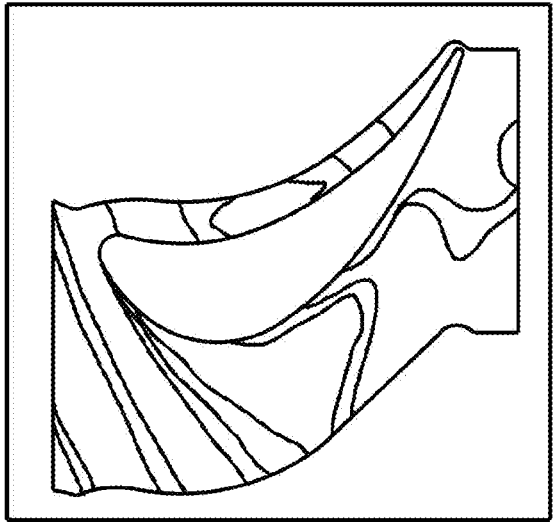
Fig. 7A — TIME = 0
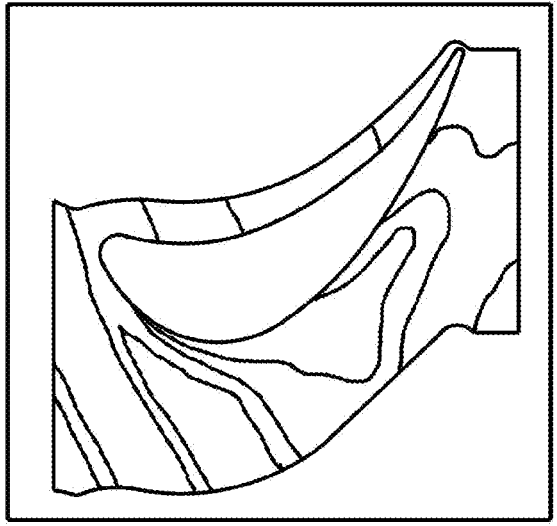
Fig. 7B — TIME = 1/4 PERIOD
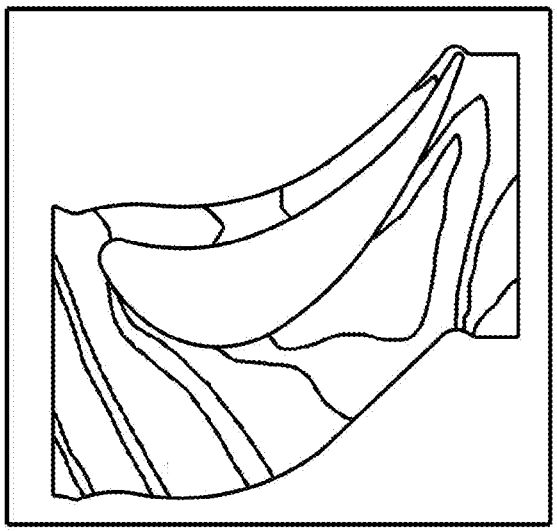
Fig. 7C — TIME = 1/2 PERIOD
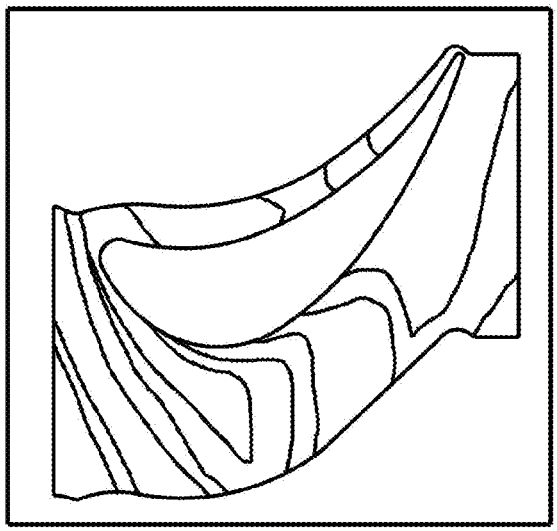
Fig. 7D — TIME = 3/4 PERIOD

FROZEN GUST ANALYSIS VIA TIME-TRANSFORMATION PITCH-CHANGE MODEL AND HARMONIC SOLUTION METHOD

CROSS-REFERENCE TO RELATED APPLICATIONS

This application claims priority to U.S. Provisional Patent Application No. 62/102,624, filed Jan. 13, 2015, entitled "Frozen Gust Analysis Via Time-Transformation Pitch-Change Model and Harmonic Solution Method," which is incorporated herein by reference in its entirety.

FIELD

This disclosure is related generally to computer-aided design and more particularly to systems and methods for modeling fluid flow in a blade row of a turbomachine.

BACKGROUND

A turbomachine is a device in which energy is transferred either to, or from, a continuously flowing fluid by the dynamic action of one or more moving blade rows. The one or more moving blade rows of a turbomachine are commonly used to compress or expand a fluid. For example, a compressor for a gas turbine engine may include several rows of rotor blades and stator blades that progressively compress a fluid to high pressures. Computational fluid dynamics (CFD) software is used to simulate and display the flow of fluid between stages of a turbomachine. In general, modern CFD software provides the ability to simulate and display flows of gases and liquids through physical systems using computer-based numerical calculations.

SUMMARY

Systems, methods, and non-transitory computer-readable storage mediums are provided for modeling fluid flow in a blade row of a turbomachine. In an example computer-implemented method for modeling fluid flow in a blade row of a turbomachine, a specification of a system is received. The system includes at least a first blade row and a second blade row of a turbomachine. A wake profile from the first blade row is imposed on the second blade row to approximate an influence of the first blade row on the second blade row. The imposing of the wake profile enables a fluid flow in the second blade row to be solved without modeling the first blade row. Governing flow equations for the fluid flow in the second blade row are transformed in time based on an inclination parameter, where the transforming in time enables a resolving of a pitch difference between the imposed wake profile and a modeled blade passage of the second blade row. Flow variables of the transformed governing flow equations are represented as a Fourier series with spatially-varying Fourier coefficients. The Fourier series representation is substituted into the transformed governing flow equations to obtain a modified form of the transformed governing flow equations. A pseudo-time term is introduced into the modified form of the transformed governing flow equations. The pseudo-time term causes the equations to have a form capable of being solved using a steady-state solution method. The modified form of the transformed governing flow equations is solved using the steady-state solution method to model the fluid flow in the second blade row.

An example computer-implemented system for modeling fluid flow in a blade row of a turbomachine includes a processing system and a memory in communication with the processing system. The processing system is configured to execute steps. In executing the steps, a specification of a system is received. The system includes at least a first blade row and a second blade row of a turbomachine. A wake profile from the first blade row is imposed on the second blade row to approximate an influence of the first blade row on the second blade row. The imposing of the wake profile enables a fluid flow in the second blade row to be solved without modeling the first blade row. Governing flow equations for the fluid flow in the second blade row are transformed in time based on an inclination parameter, where the transforming in time enables a resolving of a pitch difference between the imposed wake profile and a modeled blade passage of the second blade row. Flow variables of the transformed governing flow equations are represented as a Fourier series with spatially-varying Fourier coefficients. The Fourier series representation is substituted into the transformed governing flow equations to obtain a modified form of the transformed governing flow equations. A pseudo-time term is introduced into the modified form of the transformed governing flow equations. The pseudo-time term causes the equations to have a form capable of being solved using a steady-state solution method. The modified form of the transformed governing flow equations is solved using the steady-state solution method to model the fluid flow in the second blade row.

An example non-transitory computer-readable storage medium for modeling fluid flow in a blade row of a turbomachine includes computer-executable instructions which, when executed, cause a processing system to execute steps. In executing the steps, a specification of a system is received. The system includes at least a first blade row and a second blade row of a turbomachine. A wake profile from the first blade row is imposed on the second blade row to approximate an influence of the first blade row on the second blade row. The imposing of the wake profile enables a fluid flow in the second blade row to be solved without modeling the first blade row. Governing flow equations for the fluid flow in the second blade row are transformed in time based on an inclination parameter, where the transforming in time enables a resolving of a pitch difference between the imposed wake profile and a modeled blade passage of the second blade row. Flow variables of the transformed governing flow equations are represented as a Fourier series with spatially-varying Fourier coefficients. The Fourier series representation is substituted into the transformed governing flow equations to obtain a modified form of the transformed governing flow equations. A pseudo-time term is introduced into the modified form of the transformed governing flow equations. The pseudo-time term causes the equations to have a form capable of being solved using a steady-state solution method. The modified form of the transformed governing flow equations is solved using the steady-state solution method to model the fluid flow in the second blade row.

BRIEF DESCRIPTION OF THE DRAWINGS

FIGS. 7A-7D depict a sequence showing a hot streak location with respect to a blade.

DETAILED DESCRIPTION

Figure 1:
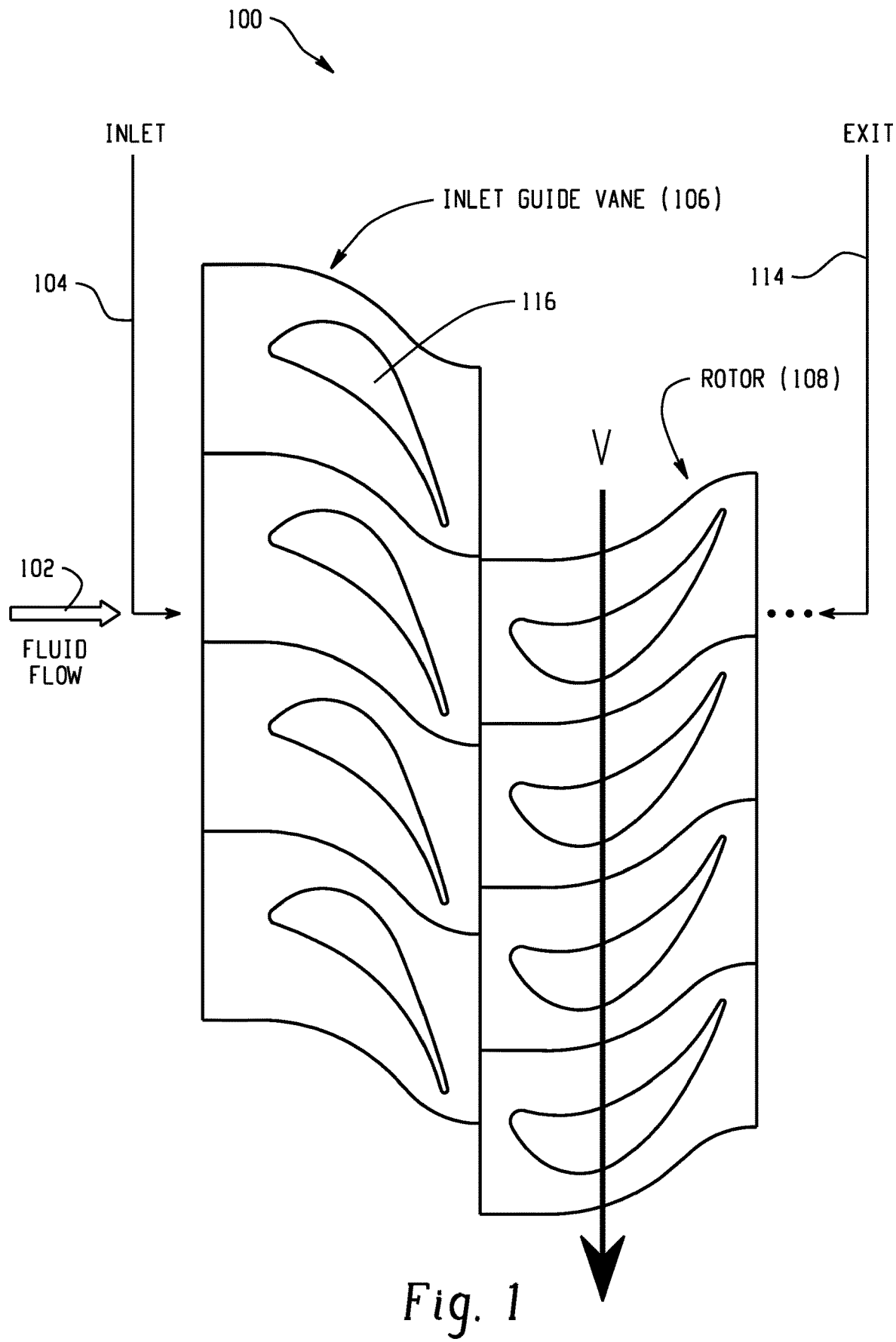
FIG. 1 depicts an example system including first and second blade rows of a turbomachine.

FIG. 1 depicts an example system 100 including first and second blade rows 106, 108. The system 100 may comprise a portion of a turbine or a compressor, for example. As illustrated in FIG. 1, the first blade row 106 may be an inlet guide vane of a turbomachine, and the second blade row 108 may be a first rotor of the turbomachine. It is noted that in other examples, the first and second blade rows 106, 108 may comprise a different pair of rotor and stator blade rows of the turbomachine. Each of the first and second blade rows 106, 108 comprise a plurality of blades 116. In the example of FIG. 1, where the second blade row 108 is the first rotor of the turbomachine, the blades of the first rotor are connected to a hub, thus allowing these blades to rotate at a circumferential velocity of V. The circumferential velocity V referred to herein is also known as a rotational velocity or a rotor blade velocity. By contrast, the blades of the inlet guide vane are stationary and do not move. The system 100 further includes an inlet 104 and an outlet 114. As illustrated in FIG. 1, a flow of fluid 102 enters the system 100 via the inlet 104 and exits the system via the outlet 114.

The system 100 represents a physical system or structure to be analyzed via a computer-aided simulation (e.g., a computational fluid dynamics (CFD) simulation). For example, the system 100 may be analyzed to model fluid flow in one or more of the blade rows 106, 108. In modeling the fluid flow in one or more of the blade rows 106, 108, the turbomachinery analysis may utilize a transient blade row analysis simulation. Such a transient simulation may be used to enhance the prediction of the blade row performance analysis and/or because the flow physics necessitates transient resolution (e.g., as in the case of hot streak migration, blade flutter, or Forced Response analysis). Further, the transient blade row analysis simulation may allow for better capturing of the complex inter-blade physics between blade rows 106, 108 as compared to conventional steady-state methods. Since the number of blades in the rows 106, 108 may be different (i.e., the blade rows 106, 108 have a pitch change), a conventional approach to modeling the fluid flow in one or more of the blade rows 106, 108 may use a full-domain modeling approach, where the entire turbomachine geometry is modeled. However, full-domain modeling is computationally expensive both in computer processing and memory requirements and is generally not practical.

To avoid the use of such full-domain modeling, the systems and methods described herein utilize a pitch-change model to model fluid flow in one or more of the blade rows 106, 108. The pitch-change model is used to model the fluid flow using a reduced geometry (e.g., a single passage or a few passages per row), thus reducing the overall computational resource requirements. As described in further detail below, the systems and methods described herein use, specifically, a time-transformation pitch-change model. The time-transformation pitch-change model is well-suited for use in solving the turbomachinery flow on a single or few passages per row, for example, if the flow to be modeled is compressible and the pitch change under consideration is near unity (e.g., between 0.75-1.4). The use of the time-transformation pitch-change model, as described herein, improves the functioning of a computer system as compared to the full-domain modeling approach, because the time-transformation pitch-change model enables the modeling of systems to be carried out (i) more efficiently (e.g., faster), (ii) with a reduced processing burden, and (iii) with reduced memory requirements, as compared to the full-domain modeling approach. For example, modeling the system 100 of FIG. 1 via the full-domain modeling approach may require modeling a system with 200 blade passages (e.g., the system may include 100 blade passages in the first blade row 106 and 100 blade passages in the second blade row 108, all of which are modeled in the full-domain modeling approach). By contrast, using the time-transformation pitch-change model employed herein, the system 100 of FIG. 1 may be modeled with only 2 blade passages, in an example. Reducing the problem from 200 blade passages to 2 blade passages, the approaches described herein permit the modeling to be carried out 100 times faster than the full-domain modeling approach. Further, use of the full-domain modeling approach would require 100 times more memory than is required when using the time-transformation pitch-change model, in this example. It is further noted that the techniques described herein improve the functioning of the computer system without sacrificing accuracy in the modeling.

To further accelerate convergence of the transient periodic flow with the time-transformation pitch-change model, the systems and methods described herein utilize a harmonic analysis method that is a hybrid time- and frequency-domain solution method. As described in further detail below, the use of the harmonic analysis method improves the functioning of a computer system as compared to previous approaches, because the harmonic analysis method enables the modeling to be carried out in less time and/or with fewer computational resources, without sacrificing accuracy in the modeling. The systems and methods described herein integrate the time-transformation method under the harmonic analysis method in order to solve for transient periodic flow in systems with a pitch change. The time-transformation and harmonic analysis methods are applied to a frozen gust analysis, as described below.

In analyzing the system 100, a specification of the system 100 is received or generated. The specification of the system 100 having the first and second blade rows 106, 108 may include positioning data (i.e., placement data) that defines a positioning of the components 106, 108 in relation to each other and in relation to other aspects (e.g., boundaries, etc.) of the system 100. The specification of the system 100 may further include geometric data comprising geometrical attributes for each of the blade rows 106, 108, among other components. In an example, the geometric data includes, for example, the shape of the blades' surfaces, number of blades per row, number of stages, and sizes of the various components included in the system 100. The positioning data and/or geometric data may comprise various other data defining characteristics of the inlet 104 and the outlet 114 and couplings between the various components of the system 100.

In an example, the specification for the system 100 may describe the geometry and/or positioning data of the system 100 as a set of surface triangles for each of the components included in the system 100. In other examples, the geometry and/or positioning data may be described using an industry standard definition (e.g., IGES, STEP, or STL), a proprietary format (e.g., ACIS, CATIA, and SDRC), or another format. Aspects of the system 100 and the geometry thereof can also be specified using mechanical CAD (MCAD) system databases, for example. It should be understood that the formats and databases listed here are examples only. Thus, the geometry and/or positioning data may be specified in any number of different formats, and the acceptable formats are not limited to those listed above. It should also be understood that the illustration of FIG. 1 may not be representative of the geometry and/or positioning data included in the specification. For example, the blade rows 106, 108 in the illustration of FIG. 1 may not be arranged based on the positioning data included in the specification. Further, although components are depicted in the illustration of FIG. 1 as being two-dimensional objects, it should be understood that the system 100 to be analyzed may include three-dimensional objects. For such three-dimensional objects, the specification includes data defining the size and shape of the components in three dimensions.

The received specification may include other parameters describing features of the system 100 to be analyzed. For example, all necessary boundary conditions to define the fluid flow in the system 100 may be included in the specification. The boundary conditions may include inlet and outlet boundary specifications such as pressure, temperature, and flow angles, among others. The specification may further include the value V specifying the rotational velocity of the first rotor 108 and other rotors included in the system 100. Various other parameters may be included in the specification of the system 100 to be analyzed (e.g., physical and material attributes for each of the components, boundary conditions for the system to be analyzed, momentum values, back pressure of one or more of the airfoils included in the system, etc.). It should be understood that the parameters listed herein as being included in the specification may not be an exhaustive list, and that various other parameters may be included in the received specification for performing the analysis of the system 100.

In analyzing the system 100, one or more computational grids may be generated based on the received specification and/or additional other parameters. Broadly, analysis of the system 100 is performed using computer-based CFD methods, which allow a continuous problem domain to be replaced with a discrete domain using the one or more computational grids. For example, in the continuous problem domain, each flow variable to be solved in the system 100 is defined at every point in the domain. By contrast, in the discrete domain, each flow variable is defined only at discrete grid points of the one or more computational grids. In the computer-based CFD method, analyzing the system 100 includes solving for the relevant flow variables only at the grid points of the computational grid, with values at other locations being determined by interpolating the values at the grid points. The computational grid may be composed, for example, of quadrilateral cells, triangular cells, or cells of another type (e.g., hexahedrals, tetrahedral, prisms, etc.), and the aforementioned grid points (i.e., nodes). As described in further detail below, in analyzing the system 100 and modeling the flow of fluid through the system 100, flow equations are solved across the one or more computational grids using computer-based numerical simulations.

Figure 2:
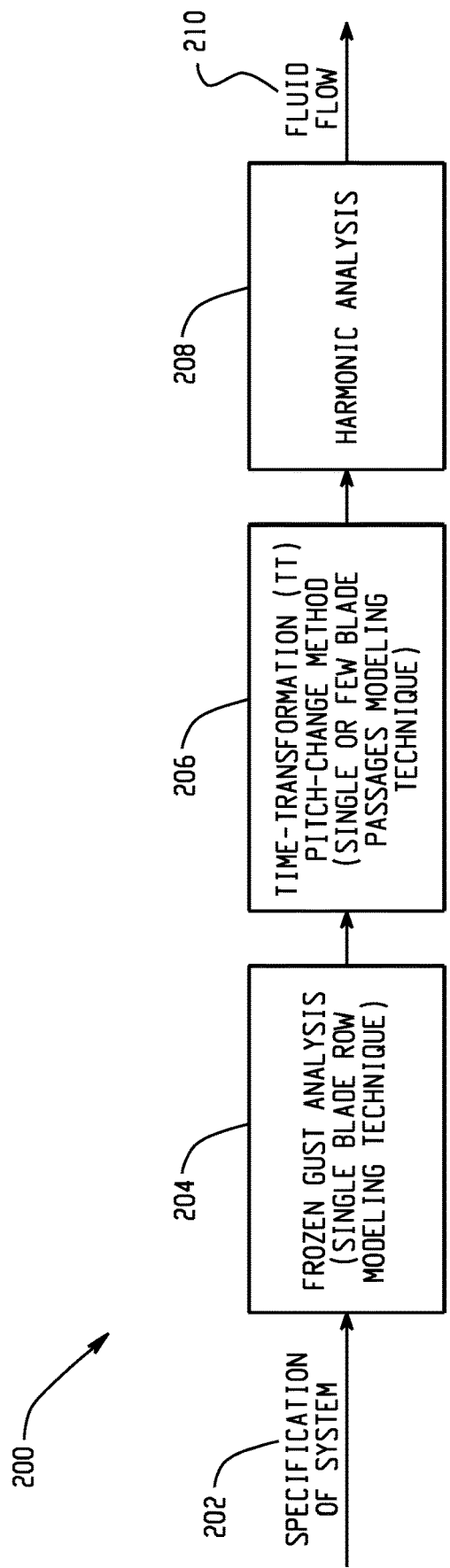
FIG. 2 is a flow diagram depicting high-level steps of a method of modeling fluid flow in a blade row of a turbomachine.

In analyzing the example system 100 including the first and second blade rows 106, 108, steps of the flow diagram 200 of FIG. 2 are performed. The steps of the flow diagram 200 are performed to solve the turbomachinery flow problem and ultimately model a fluid flow 210 in one or more blade rows of the system 100. As illustrated in FIG. 2, the systems and methods described herein include (i) a frozen gust analysis 204, (ii) a time-transformation pitch-change method 206, and (iii) a harmonic analysis method 208. In analyzing the example system 100, a specification 202 of the system 100 is received, with the specification 202 including one or more of the features described above with reference to FIG. 1.

The frozen gust analysis 204 (also known as wake-rotor interaction analysis) enables a fluid flow in one of the two blade rows 106, 108 to be solved without modeling the other blade row. Thus, the frozen gust analysis 204 is a single blade row modeling technique that enables an approximation of blade row interaction between stator and rotor rows of a turbomachine. In this modeling technique, an influence of a first blade row on a second blade row is approximated by imposing a wake profile from the first blade row on a passage inlet of the second blade row. Thus, in an example, an influence of an upstream blade row on a downstream blade row is approximated by imposing a wake profile from the upstream blade row on a passage inlet of the downstream blade row. In another example, a wake profile from the downstream blade row is imposed on the upstream blade row to approximate an influence of the downstream blade row on the upstream blade row. Typically the inlet profile from the first blade row is obtained from a steady-state blade row analysis that utilizes a mixing-plane model. Using the frozen gust analysis 204, many turbomachinery problems can be approximated by imposing the inlet profile and solving the flow in a single row.

Figure 3B:
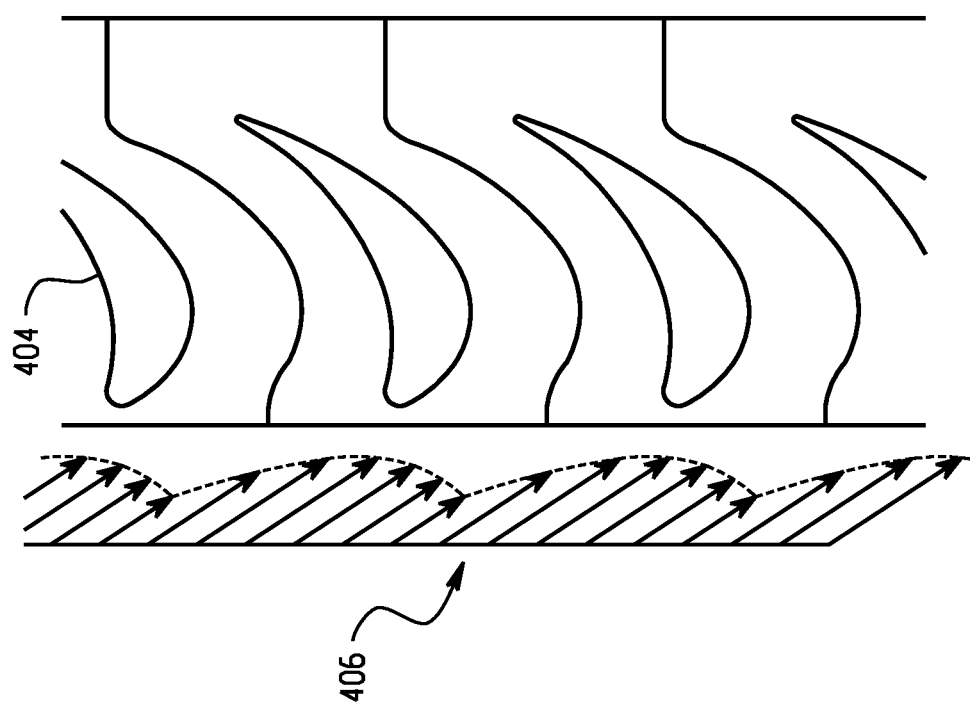
FIG. 3B depicts the wake from the upstream blade row imposed on a downstream passage of the turbomachine.
Figure 3A:
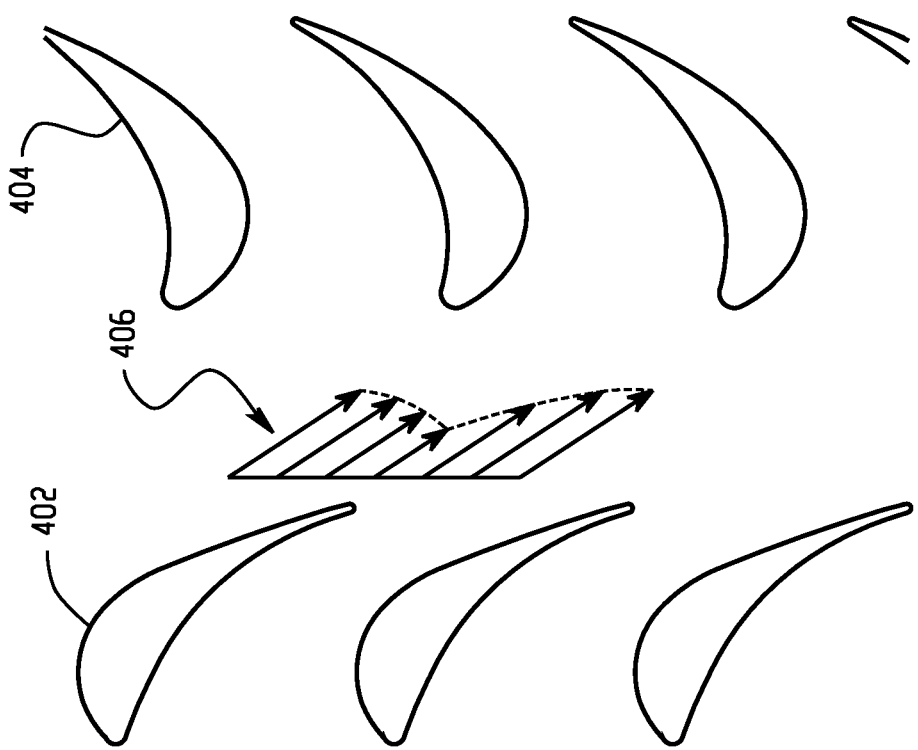
FIG. 3A depicts a wake from an upstream blade row of a turbomachine.

FIGS. 3A and 3B illustrate aspects of the frozen gust analysis 204. In these figures, an influence of an upstream blade row 402 on a downstream blade row 404 is approximated by imposing a wake profile 406 from the upstream blade row 402 on a passage inlet of the downstream blade row 404. Thus, FIG. 3A depicts the wake profile 406 from the upstream blade row 402 of a turbomachine, and FIG. 3B depicts the wake profile 406 being imposed on the downstream passage 406 of the turbomachine. Although the example of FIGS. 3A and 3B depicts a wake profile of an upstream blade row being imposed on a downstream blade row, it should be understood that in other examples, a wake profile from the downstream blade row is imposed on the upstream blade row. In these other examples, the frozen gust analysis is used to approximate an influence of the downstream blade row on the upstream blade row.

With reference again to FIG. 2, the time-transformation pitch-change method 206 enables the fluid flow in one of the two blade rows 106, 108 to be modeled using a reduced turbomachinery geometry that includes a single blade passage or few blade passages of a respective blade row. The time-transformation pitch-change method 206 enables a resolving of a pitch difference between the imposed wake profile from the first blade row (e.g., as determined as part of the frozen gust analysis 204 described above) and a modeled blade passage of the second blade row. In situations where a pitch of the wake profile from the first blade row is larger or smaller than the modeled blade pitch of the second blade row, previous approaches have required that the entire blade row wheel be modeled. Modeling the entire blade row wheel is computationally expensive.

To avoid the need to model the entire blade row wheel, the time transformation pitch-change model 206 is used. Aspects of the time-transformation pitch-change method 206 are described in "Calculation of Unsteady Wake/Rotor Interaction," M. B. Giles, Journal of Propulsion Vol. 4, No. 4, 1988, and in "A Comparison of Advanced Numerical Techniques to Model Transient Flow in Turbomachinery Blade Rows," S. Connell et al., ASME Turbo Expo 2011, Vancouver, BC, Canada GT2011-45820, both of which are incorporated herein by reference in their entireties. The time-transformation pitch-change method 206 is used to solve the frozen gust analysis 204 on a single or few blade passages only. By reducing the geometry of the system to be modeled, the time-transformation pitch-change method 206 improves the functioning of a computer system as compared to the full-domain modeling approach, because the reduced geometry enables the modeling to be carried out (i) more efficiently (e.g., faster), (ii) with a reduced processing burden, and (iii) with reduced memory requirements, as compared to the full-domain modeling approach. The time-transformation pitch-change method 206 includes the transformation of governing flow equations (e.g., Euler or Navier-Stokes equations) in time, such that the phase-shifted flow problem becomes instantaneously periodic in computational transformed time (e.g., inclined time), thus avoiding any special numerical treatment on the pitchwise boundaries. The transforming of the governing flow equations according to the time-transformation pitch-change method 206 is described in further detail below with reference to FIG. 4.

The harmonic analysis method 208 is based on the harmonic balance/time spectral solution method and utilizes a hybrid time-frequency numerical solution method to obtain a fast solution to transient periodic flow. Conventional time-marching methods converge on a transient periodic flow by advancing the solution in time until the flow reaches a time-periodic state. The conventional time-marching methods generally take a very long time to reach a converged, periodic-in-time state and thus require significant computational resources. To avoid the use of such conventional time-marching methods, the harmonic analysis method 208 is used. As described below, the harmonic analysis method 208 uses fast steady-state solution methods and thus improves the functioning of a computer system as compared to the conventional time-marching methods. The fast steady-state solution methods of the harmonic analysis method 208 enable modeling to be carried out in less time and/or with fewer computational resources, without sacrificing accuracy in the modeling. Aspects of the harmonic analysis method 208 are described in "Computation of Unsteady Nonlinear Flows in Cascades Using Harmonic Balance Technique," K. C. Hall et al., AIAA Journal, Vol. 40, No. 5, 2002, and in "Three-Dimensional Unsteady Multi-stage Turbomachinery Simulations Using the Harmonic Balance Technique," A. Gopinath et al., AIAA Paper 2007-0892, 45th Aerospace Sciences Meeting & Exhibit, Reno, Nev. 2007, both of which are incorporated herein by reference in their entireties.

In the harmonic analysis method 208, if the flow is transient (i.e., unsteady) and periodic at a known frequency, then the flow variations can be approximated as harmonics of the fundamental frequency by a Fourier series representation. In the example of FIG. 1 involving turbomachinery, the known frequency of the periodic flow may be a frequency of the wake profile that is imposed on one of the two blade rows 106, 108. The harmonics of the Fourier series representation are then substituted into the governing flow equation to transform the governing flow equation into a set of equations that represents a uniform sampling within the period of the fundamental frequency. The form of the coupled set of transformed equations is similar to a steady-state equation, and therefore, the coupled set of transformed equations can be advanced to convergence using fast steady-state solution methods. The accuracy of the harmonic analysis method 208 is controlled by the number of harmonics (i.e., modes) retained in the Fourier series representation. In general, a minimum of N=2M+1 time level samples per period are used to describe the flow, where M is the number of harmonics retained in the Fourier series representation. In an example, at least three harmonics are retained in the Fourier series representation, thus requiring a minimum of seven time-level solutions per period to describe the flow.

Figure 4:
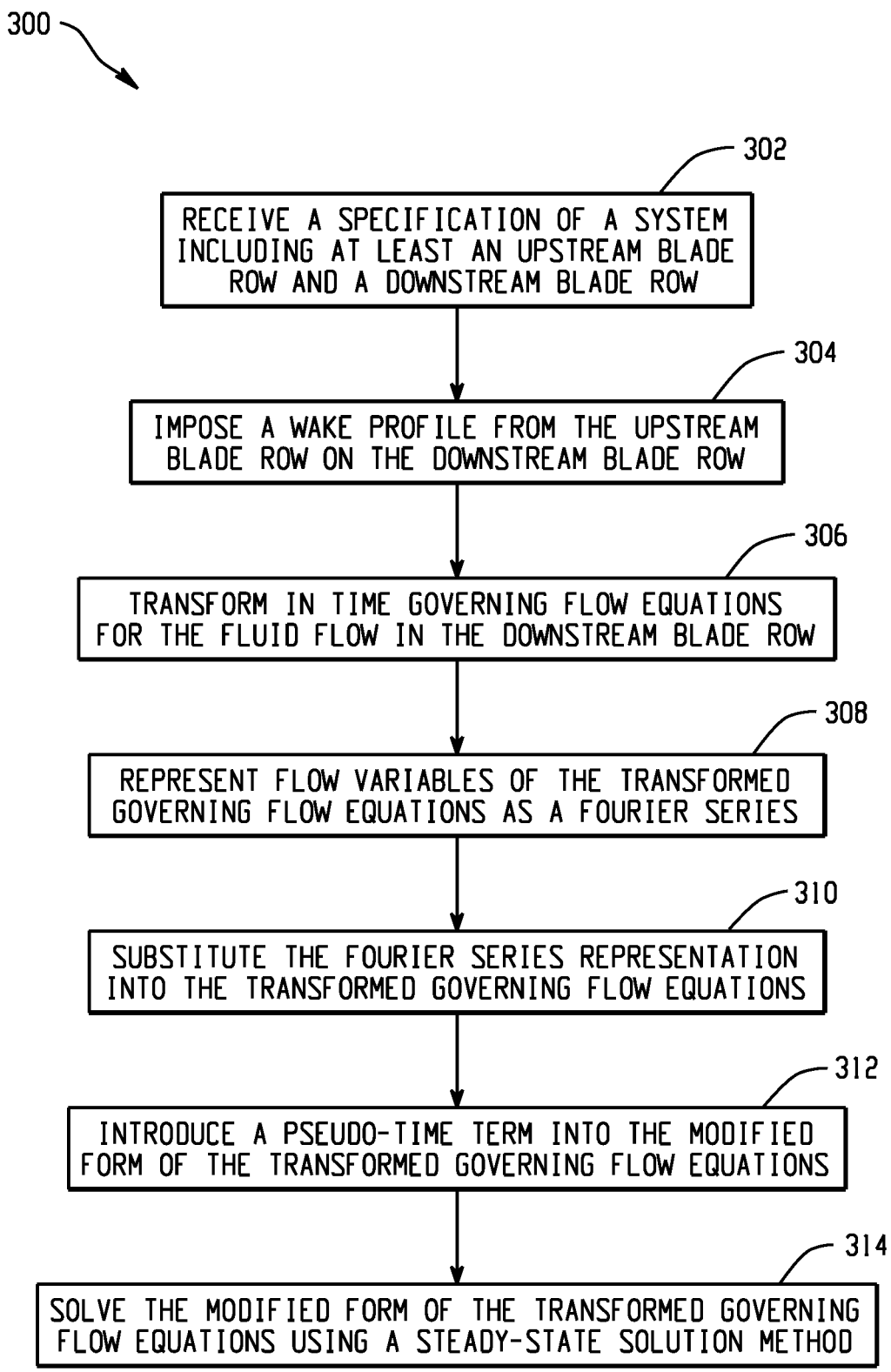
FIG. 4 is a flow diagram depicting example steps of computer-implemented method of modeling fluid flow in a blade row of a turbomachine.

FIG. 2 describes high-level steps of a method for modeling fluid flow in a blade row of a turbomachine, where the steps enable turbomachinery transient flow solutions to be obtained with the frozen gust analysis 204 and using a combination of the time-transformation pitch-change method 206 and the harmonic analysis solution method 208. As described above, the method involves solving time-transformed governing flow equations using the harmonic analysis solution method 208. FIG. 4 is a flow diagram 300 depicting additional steps of a computer-implemented method of modeling fluid flow in a blade row of a turbomachine. The example steps of FIG. 4 provide additional details regarding the high-level steps described above with reference to FIG. 2.

In FIG. 4, at 302, a specification of a system is received. Features of the received specification are described above with reference to FIG. 1. The system includes at least a first blade row and a second blade row of a turbomachine, and the steps 302-314 of FIG. 4 are used in modeling a fluid flow in the second blade row. Of the first and second blade rows, the second blade row may be the "upstream" blade row of the two blade rows, or the second blade row may be the "downstream" blade row of the two blade rows. Thus, it should be appreciated that the terms "first blade row" and "second blade row" do not denote an order of the blade rows within the turbomachine or a positioning of the blade rows with respect to an inlet or outlet of the turbomachine.

At 304, a wake profile from the first blade row is imposed on the second blade row to approximate an influence of the first blade row on the second blade row. The imposing of the wake profile enables the fluid flow in the second blade row to be solved without modeling the first blade row. Step 304 of the computer-implemented method is performed as part of a frozen gust analysis, as described above with reference to FIG. 2. The wake profile may be imposed, specifically, on an inlet of the second blade row. In an example, the wake profile from the first blade row is determined using a steady-state blade row analysis with a mixing-plane interface between the first and second blade rows. The use of the steady-state blade row analysis with the mixing-plane interface is described below with reference to FIG. 5.

At 306, governing flow equations (e.g., Euler or Navier-Stokes) for the fluid flow in the second blade row are transformed in time based on an inclination parameter, where the transforming in time enables a resolving of a pitch difference between the imposed wake profile and a modeled blade passage of the second blade row. The pitch difference causes a pitch of the imposed wake profile to be not equal to a pitch of the second blade row. The transforming in time of the governing flow equations comprises a step of the time-transformation pitch-change technique described above with reference to FIG. 2. The time-transformation pitch-change technique enables the fluid flow in the second blade row to be modeled using a reduced turbomachinery geometry that includes a single blade passage or few blade passages of the second blade row.

The transformation of the governing flow equations in time causes the phase-shifted flow problem to become instantaneously periodic in computational transformed time (i.e., inclined time). The transformation in time obviates the need for any special numerical treatment on pitchwise boundaries. To illustrate aspects of the transformation in time, the governing flow equations may be represented as $$\frac{\partial Q}{\partial t} + \frac{\partial E}{\partial x} + \frac{\partial G}{\partial y} = 0, \qquad \text{Equation 1}$$

where Q is a conservative solution vector, E and G are flux vectors, and physical coordinates of the system include spatial coordinates x and y and temporal coordinate t.

In modeling the fluid flow in the second blade row of the turbomachine, the fluid flow is an unsteady (i.e., transient) flow that is temporally and spatially periodic. The temporal periodicity of the fluid flow requires $$Q(x,y,t)=Q(x,y,t+T), \qquad \text{Equation 2}$$

where T is a temporal period of the unsteadiness of the fluid flow.

One or more computational grids may be defined based on the physical coordinates. The transforming in time of the governing flow equations includes transforming the physical coordinates to a set of computational coordinates x', y', t' as follows:

$$x'=x;$$

$$y'=y;$$

$$t'=t-\lambda y. \qquad \text{Equation 3}$$

In Equation 3, the variable λ is the inclination parameter used in the transformation of the governing flow equations. The inclination parameter is based on (i) a pitch of the wake profile imposed on the second blade row, and (ii) a pitch of the second blade row. Specifically, the inclination parameter is equal to $$\lambda = \frac{Ps - Pr}{Pr * Us}, \qquad \text{Equation 4}$$

where Ps is the pitch of the wake profile, Pr is the pitch of the second blade row, and Us is a rotational velocity of one or more rotating rows included in the system.

The governing flow equations are transformed into a computational coordinate system defined by the set of computational coordinates x', y', t' to yield the transformed governing flow equations represented as $$\frac{\partial Q'}{\partial t'} + \frac{\partial E}{\partial x'} + \frac{\partial G}{\partial y'} = 0, \qquad \text{Equation 5}$$

where Q' is equal to (Q−λG). In conventional methods, Equation 5 is solved using a standard time-marching method to determine the fluid flow in the second blade row. By contrast, in the computer-implemented systems and methods described herein, the fluid flow in the second blade row is not determined by solving Equation 5 using a time-marching method. Rather, as described below, the harmonic analysis method is used in solving Equation 5.

At 308, flow variables of the transformed governing flow equations are represented as a Fourier series with spatially-varying Fourier coefficients. To represent the transformed governing flow equations as the Fourier Series, Equation 5 is rewritten in a semi-discrete form as $$\frac{\partial Q'}{\partial t'} = -R(Q'), \qquad \text{Equation 6}$$

and the time periodic flow is described by the Fourier series:

$$Q'_j = \hat{Q}'^0_j + \sum_{m=1}^{M} \hat{Q}'^{mc}_j \text{Cos}(m\omega t') + \sum_{m=1}^{M} \hat{Q}'^{ms}_j \text{Sin}(m\omega t'), \qquad \text{Equation 7}$$

$$R_j = \hat{R}^0_j + \sum_{m=1}^{M} \hat{R}^{mc}_j \text{Cos}(m\omega t') + \sum_{m=1}^{M} \hat{R}^{ms}_j \text{Sin}(m\omega t'), \qquad \text{Equation 8}$$

where M is a number of harmonics retained in the Fourier series representation, ω is the disturbance angular frequency equal to (2π/T), $\hat{Q}'^{mc}_j$ and $\hat{Q}'^{ms}_j$ are the cosine and sine of Fourier coefficient for the flow variable Q'$_j$ at mesh location j, and $\hat{R}^{mc}_j$ and $\hat{R}^{ms}_j$ are the cosine and sine of the Fourier coefficient for the residual term R$_j$ at the mesh location j. With the M harmonics retained in the Fourier series representation of the flow, N=2M+1 coefficients are stored for each flow variable (e.g., one for the zero-th harmonic or mean flow and 2M for the real and imaginary parts of the remaining harmonics). The Fourier series representation approximates flow variations in the fluid flow as harmonics of a fundamental frequency. As described below, these harmonics are substituted into the transformed governing flow equations.

At 310, the Fourier series representation is substituted into the transformed governing flow equations to obtain a modified form of the transformed governing flow equations. Specifically, (i) flow harmonics of the Fourier series representation are substituted into the transformed governing flow equations, (ii) and then a Discrete Inverse Fourier Transform (DIFT) is used to put the equation back in the time-domain and obtain the modified form of the transformed governing flow equations represented as:

$$[P]\{\tilde{Q}'_j\}+\{\tilde{R}_j\}=\{0\}, \qquad \text{Equation 9}$$

where matrix [P] contains the time spectral operator coupling all 2M+1 time levels together, $\{\tilde{Q}'_j\}$ s a vector of conservation variables at (2M+1) equally-spaced points in time over one temporal period T, the temporal period T being a period of unsteadiness of the periodic fluid flow in the second blade row, and $\{\tilde{R}_j\}$ is a vector of flux variables at the (2M+1) equally-spaced points in time over the one temporal period T. The resultant system of equations represented by Equation 9 comprises a hybrid form including terms in a time domain and terms in a frequency domain and couples N=2M+1 time level solutions together through the [P] matrix.

At 312, a pseudo-time term is introduced into the modified form of the transformed governing flow equations. The pseudo-time term causes the equations to have a form capable of being solved using a steady-state solution method. Specifically, the introducing of the pseudo-time term into Equation 9 yields the following form of the equations capable of being solved using the steady-state solution method:

$$\frac{\partial\{\tilde{Q}'_j\}}{\partial\tau} + [P]\{\tilde{Q}'_j\} + \{\tilde{R}_j\} = \{0\}, \quad \text{Equation 10}$$

where $$\frac{\partial\{\tilde{Q}'_j\}}{\partial\tau}$$

is the pseudo-time term including a fictitious time τ used to march the solution to a steady state by driving the pseudo-time term to zero. It should be understood that the steps 308, 310, 312 including the (i) representing of the flow variables as the Fourier series, (ii) the substituting of the Fourier series representation into the transformed governing flow equations, and (iii) the introducing of the pseudo-time term comprise steps of a harmonic analysis method. As described above, the harmonic analysis method enables the transformed governing flow equations to be solved using a hybrid time-frequency solution strategy.

At 314, the modified form of the transformed governing flow equations is solved using the steady-state solution method to model the fluid flow in the second blade row. As explained above, with the M harmonics retained in the Fourier series representation of the flow, N=2M+1 Fourier coefficients are stored for each flow variable. In solving Equation 10, the N=2M+1 Fourier coefficients for each flow variable may be determined based on a knowledge of a temporal behavior of the flow variables at N=2M+1 equally-spaced points in time over the temporal period T In an example, Equation 10 is solved using a numerical solution procedure, whereby 2M+1 computational grids are generated, with each of the computational grids being associated with one of the 2M+1 equally-spaced points in time. At each node of the 2M+1 computational grids, values are stored for one or more of the flow variables included in Equation 10. The pseudo-time harmonic balance equation represented by Equation 10 is discretized across the 2M+1 computational grids using a computational fluid dynamics (CFD) technique. The pseudo-time harmonic balance equation is solved across the 2M+1 computational grids using computer-based numerical calculations, where the solving of the pseudo-time harmonic balance equation includes the determining of the 2M+1 Fourier coefficients for each flow variable.

The present inventors have observed a need for systems and methods for turbomachinery blade row analysis that enable the modeling of complex flow and physics in a reasonable amount of time (e.g., during the design cycle of a turbomachine). Accordingly, the present inventors have developed novel systems and methods for performing such turbomachinery blade row analysis. The numerical solution method strategy described herein, integrating the time-transformation method under the harmonic analysis method, has not been realized or conceived of previously and makes possible a powerful new analysis tool. For example, the systems and methods described herein enable software (e.g., ANSYS-CFX software) to be used during the design of turbomachinery by allowing engineers to: (i) improve the aerodynamic efficiency of the turbomachinery (e.g., produce more thrust, generate more power, reduce losses), (ii) extend the durability of the turbomachinery (e.g., extend the life of the turbomachinery), and (iii) improve the fuel consumption efficiency of the turbomachinery (e.g., lowering the operating cost of the turbomachinery). The systems and methods described herein facilitate a more powerful numerical discretization for certain classes of turbomachine topology that is not realized in previous approaches. The more powerful numerical discretization allows for convergence on a solution in a shorter amount of time than what has been seen in the past. The failure of others to realize or conceive of the integration of the time-transformation method under the harmonic analysis method may be due to various factors: (i) the complexity of both the time-transformation and harmonic analysis methods, (ii) a general lack of understanding and literature concerning the use of the time-transformation method in the time domain, and/or (iii) the conventional association of the harmonic analysis method with models other than the time-transformation model.

FIGS. 5-8 illustrate aspects of a hot streak migration flow problem solved using the systems and methods described herein. It should be understood that the hot streak migration flow problem is only an example and that other types of flow problems may be solved using the combination of the time-transformation pitch-change and harmonic analysis techniques described herein. In turbine flow analysis, hot streaks refer to the local hot streams of gases emanating from burners of a gas turbine combustor that is positioned in front of the turbine. Hot streaks enter the inlet of the turbine stage, passing through the inlet guide vane (IGV) and propagating through the rows of turbine stages.

In the example of FIGS. 5-8, thirty-six (36) hot streaks entering a turbine stage are modeled using the frozen gust analysis technique described above. The example turbine of FIGS. 5-8 (e.g., having the Aachen Turbine Geometry provided by the Institute of Jet Propulsion and Turbomachinery, RWTH Aachen, Germany) contains thirty-six (36) IGV rows (e.g., stator rows) and forty-two (42) rotor rows. The hot streaks are positioned between an IGV row and a rotor row at approximately mid-span. A transient flow simulation is obtained from the frozen gust analysis and using the systems and methods described herein (i.e., utilizing the combination of the time-transformation pitch-change and harmonic analysis techniques). As noted above, the time-transformation method is used to handle the pitch-change difference between the hot streak profile and the pitch of the rotor.

Figure 5:
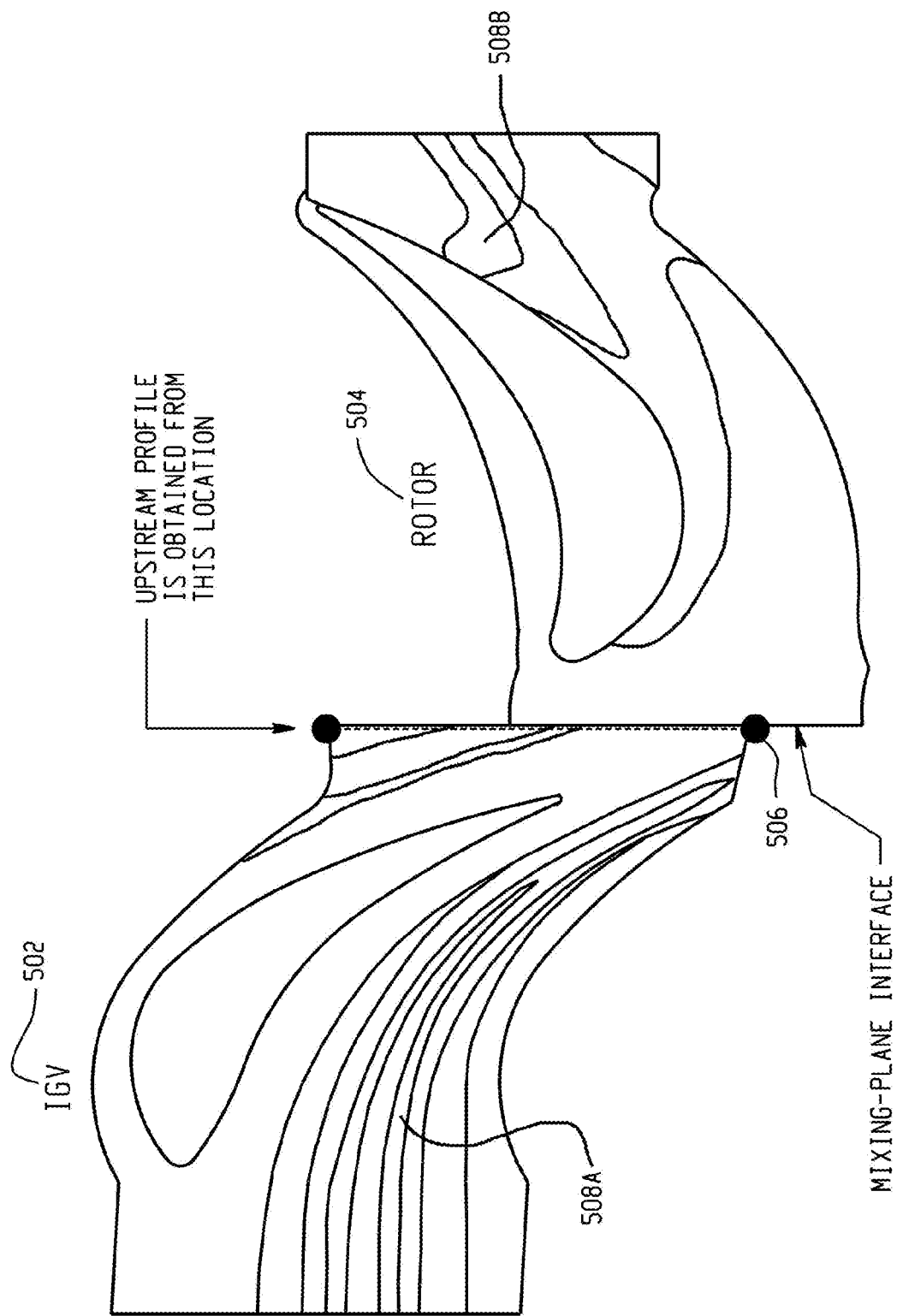
FIG. 5 depicts aspects of a steady-state solution with mixing-plane interface used to obtain a hot streak profile from an exit of an inlet guide vane.

FIG. 5 depicts aspects of the frozen gust analysis used in solving the hot streak migration flow problem. As described above, the frozen gust analysis includes imposing a wake profile from a first blade row on a second blade row to approximate an influence of the first blade row on the second blade row. The wake profile from the first blade row may be obtained from a steady-state analysis with a mixing-plane interface between the first and second blade rows. To illustrate the obtaining of the wake profile in the context of the hot streak migration flow problem example, FIG. 5 depicts the obtaining of a hot streak profile from an exit of the IGV row 502 via a steady-state analysis with a mixing-plane interface 506 between the IGV and rotor rows 502, 504. As shown in FIG. 5, the hot streak profile is obtained at the location of the mixing-plane interface 506. The hot streak profile includes temperature contours 508A, 508B, as shown in the figure. The wake profile obtained from the upstream IGV row 502 is imposed as an inlet disturbance on a passage of the downstream rotor row 504.

Figure 6:
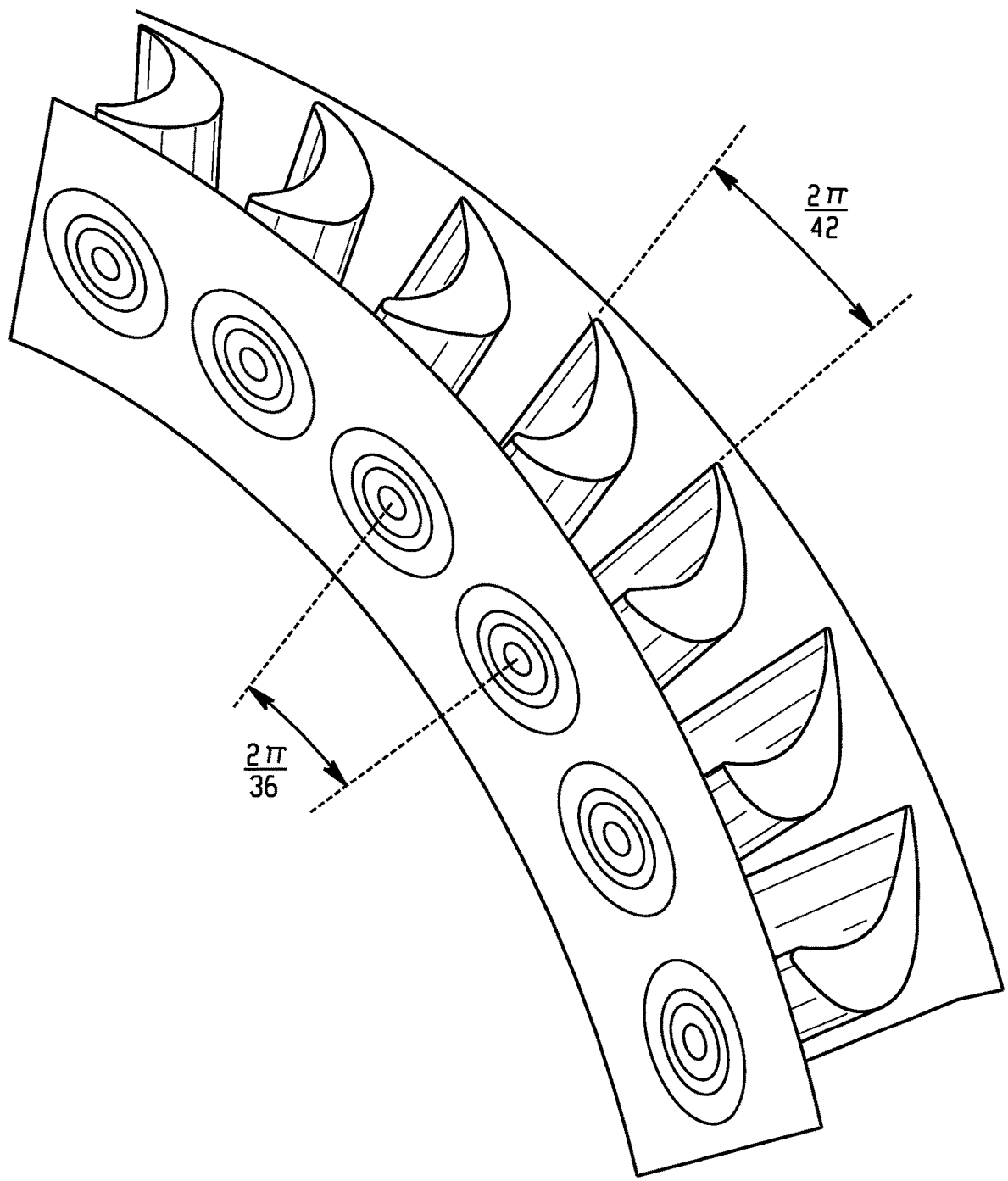
FIG. 6 shows a one-sixth (⅙) section of an Aachen rotor row.

FIG. 6 shows that a pitch of the hot streak profile is larger than a pitch of the rotor in the example of FIGS. 5-8. Specifically, FIG. 6 shows a one-sixth (⅙) section of an Aachen rotor row to illustrate that the pitch of the hot streak profile entering the rotor passage is larger than the rotor pitch. The pitch of the hot streak profile is 10 degrees, and the pitch of the rotor passage is 8.57 degrees in the example of FIG. 6. The time-transformation pitch-change model is used to transform in time governing flow equations for the fluid flow in the rotor, with the transforming in time enabling a resolving of the pitch difference between the hot streak profile and a modeled blade passage of the rotor. Thus, the time-transformation pitch-change model enables the modeling of the flow in the rotor using only a single rotor passage. The flow is solved using the harmonic analysis method, and FIGS. 7A-7D show solutions obtained at four different instances of time. Specifically, FIGS. 7A-7D depict a sequence showing a hot streak location with respect to a rotor blade at four different times, $t_1=0$, $t_2=¼$ period, $t_3=½$ period, and $t_4=¾$ period, respectively. In the sequence shown in FIGS. 7A-7D, the hot streak appears to be moving and not the rotor. However, in reality, the hot streak is stationary, and the rotor is moving. In the sequence of FIGS. 7A-7D, the rotor appears stationary while the hot streaks are moving because the flow solution is solved in the frame of the rotor, in this example.

Figure 8:
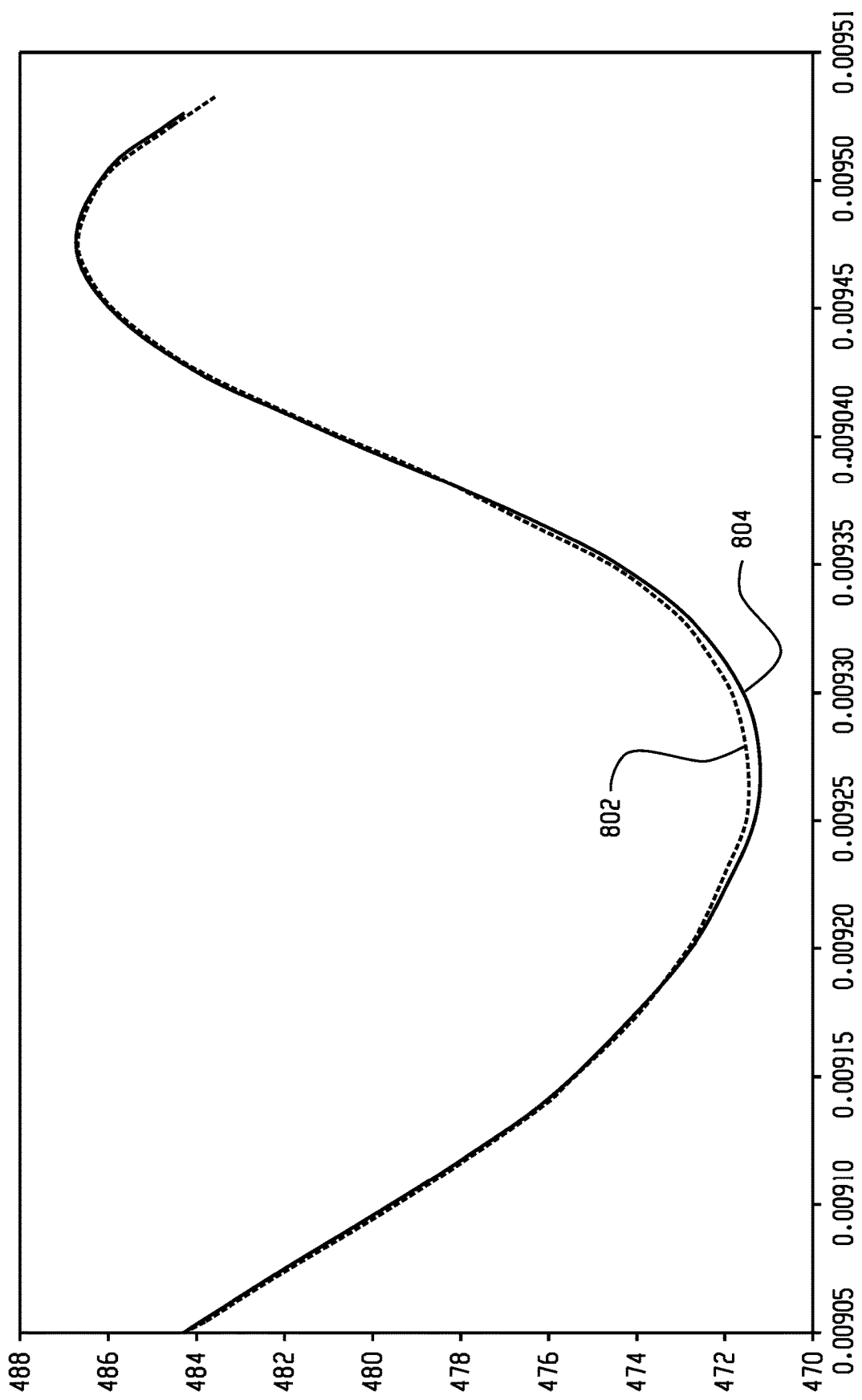
FIG. 8 is a graph that compares results obtained using the systems and methods described herein with results obtained using a conventional time-marching method.

FIG. 8 is a graph that compares results obtained using the systems and methods described herein with results obtained using a conventional time-marching method. The results shown in FIG. 8 are for the hot streak migration flow problem described above with reference to FIGS. 5-7. In obtaining the results using the conventional time-marching method, the time-transformation pitch-change method is used to resolve the pitch change difference between the hot streak profile and the rotor pitch. FIG. 8 shows, specifically, a temperature history at a monitor point located at mid-span between IGV and rotor rows and on a suction side of the rotor blade. As shown in the figure, the results 804 from the harmonic analysis are similar to the results 802 obtained with the time-marching method, but the results 804 from the harmonic analysis method may be obtained in less time and/or with fewer computational resources. In the example of FIG. 8, the results 804 from the harmonic analysis were obtained using five (5) harmonics, and the results 802 from the time-marching method were obtained with one hundred twenty (120) time-steps per wake passing.

This written description uses examples to disclose the invention, including the best mode, and also to enable a person skilled in the art to make and use the invention. The patentable scope of the invention may include other examples. Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive of" may be used to indicate situations where only the disjunctive meaning may apply.

It is claimed:

1. A computer-implemented method of modeling fluid flow in a blade row of a turbomachine, the method comprising:

receiving a specification of a system including a first blade row and a second blade row of a turbomachine;

imposing a wake profile from the first blade row on the second blade row to approximate an influence of the first blade row on the second blade row, the imposing of the wake profile enabling a fluid flow in the second blade row to be solved without modeling the first blade row, the wake profile being periodic at a known frequency;

calculating an inclination parameter based on a pitch difference between the imposed wake profile and a modeled blade passage of the second blade row, wherein the fluid flow in the second blade row is governed by time-transformed governing flow equations based on the inclination parameter;

representing flow variables of the time-transformed governing flow equations according to a Fourier series with spatially-varying Fourier coefficients and a fundamental frequency equal to the known frequency, wherein a modified form of the time-transformed governing flow equations that represents a uniform sampling within a period of the fundamental frequency, the modified form of the time-transformed governing flow equations corresponding to the governing flow equations modified based on the representation of the flow variables;

the modified form of the time-transformed governing flow equations including a pseudo-time term, the pseudo-time term causing the modified form of the time-transformed governing flow equations to have a form capable of being solved using a steady-state solution method; and solving the modified form of the time-transformed governing flow equations using the steady-state solution method to model the fluid flow in the second blade row.

2. The computer-implemented method of claim 1,
wherein a pitch of the wake profile is not equal to a pitch of the second blade row,
wherein the transforming of the governing flow equations in time comprises a step of a time-transformation pitch-change technique that enables the fluid flow in the second blade row to be modeled using a reduced turbomachinery geometry that includes a single blade passage or few blade passages of the second blade row, and
wherein the transforming of the governing flow equations in time causes the flow problem to be instantaneously periodic in the transformed time domain.

3. The computer-implemented method of claim 1 comprising:
determining the wake profile from the first blade row using a steady-state blade row analysis with a mixing-plane interface between the first and second blade rows.

4. The computer-implemented method of claim 1, wherein the fluid flow in the second blade row is an unsteady flow that is temporally and spatially periodic.

5. The computer-implemented method of claim 4, wherein the temporal periodicity of the fluid flow requires $$Q(x,y,t)=(x,y,t+T),$$

where Q is a vector of conservation variables describing the fluid flow, physical coordinates of the system include spatial coordinates x and y and temporal coordinate t, T is a temporal period of the unsteadiness of the fluid flow, and wherein M harmonics are retained in the Fourier series representation and (2M+1) Fourier coefficients are retained for each flow variable, the method further comprising:
determining the (2M+1) Fourier coefficients for each flow variable based on a knowledge of a temporal behavior of the flow variables at (2M+1) equally-spaced points in time over the temporal period T.

6. The computer-implemented method of claim 5, wherein the modified form of the transformed governing flow equations is a pseudo-time harmonic balance equation, the method further comprising:
generating (2M+1) computational grids, wherein each of the computational grids is associated with one of the (2M+1) equally-spaced points in time;
at each node of the (2M+1) computational grids, storing values of one or more of the flow variables;
discretizing the pseudo-time harmonic balance equation across the (2M+1) computational grids using a computational fluid dynamics (CFD) technique; and
solving the pseudo-time harmonic balance equation across the (2M+1) computational grids using computer-based numerical calculations, wherein the solving of the pseudo-time harmonic balance equation includes the determining of the (2M+1) Fourier coefficients for each flow variable.

7. The computer-implemented method of claim 1, wherein the inclination parameter is based on (i) a pitch of the wake profile imposed on the second blade row, and (ii) a pitch of the second blade row.

8. The computer-implemented method of claim 1, wherein the governing flow equations are Euler equations or Navier-Stokes equations.

9. The computer-implemented method of claim 1, wherein the governing flow equations are represented as $$\frac{\partial Q}{\partial t} + \frac{\partial E}{\partial x} + \frac{\partial G}{\partial y} = 0,$$

where Q is a conservative solution vector, E and G are flux vectors, and physical coordinates of the system include spatial coordinates x and y and temporal coordinate t, wherein the transforming in time of the governing flow equations comprises:
transforming the physical coordinates to a set of computational coordinates x', y', t' using $$x'=x,$$

$$y'=y,$$

$$t'=t-\lambda y,$$

where λ s the inclination parameter;
transforming the governing flow equations into a computational coordinate system defined by x', y', t' to yield the transformed governing flow equations represented as $$\frac{\partial Q'}{\partial t'} + \frac{\partial E}{\partial x'} + \frac{\partial G}{\partial y'} = 0,$$

where Q' is equal to (Q−λG).

10. The computer-implemented method of claim 9, wherein the inclination parameter is $$\lambda = \frac{Ps - Pr}{Pr * Us},$$

where Ps is the pitch of the wake profile, Pr is the pitch of the second blade row, and Us is a rotational velocity of one or more rotating blade rows included in the system.

11. The computer-implemented method of claim 9, wherein the representing of the flow variables as the Fourier series comprises:
rewriting the transformed governing flow equations in a semi-discrete form as $$\frac{\partial Q'}{\partial t'} = -R(Q'),$$

wherein the Fourier series representation comprises $$Q'_j = \hat{Q}'^0_j + \sum_{m=1}^{M} \hat{Q}'^{mc}_j \cos(m\omega t') + \sum_{m=1}^{M} \hat{Q}'^{ms}_j \sin(m\omega t'),$$

$$R_j = \hat{R}^0_j + \sum_{m=1}^{M} \hat{R}^{mc}_j \cos(m\omega t') + \sum_{m=1}^{M} \hat{R}^{ms}_j \sin(m\omega t'),$$

where M is a number of harmonics retained in the Fourier series representation, ω is the disturbance angular frequency, $\hat{Q}'^{mc}_j$ and $\hat{Q}'^{ms}_j$ are the cosine and sine of Fourier coefficient for the flow variable $Q'_j$ at mesh location j, and $\hat{R}^{mc}_j$ and $\hat{R}^{ms}_j$ are the cosine and sine of the Fourier coefficient for the residual term $R_j$ at the mesh location j.

12. The computer-implemented method of claim 11, wherein the substituting of the Fourier series representation into the transformed governing flow equations comprises:
substituting flow harmonics of the Fourier series representation into the transformed governing flow equations followed by Discrete Inverse Fourier Transform (DIFT) to put the equation back in the time-domain and obtain the modified form of the transformed governing flow equations represented as $$[P]\{\tilde{Q}'_j\}+\{\tilde{R}_j\}=\{0\},$$

where matrix [P] contains the time spectral operator coupling all 2M+1 time levels together, $\{\tilde{Q}'_j\}$ is a vector of conservation variables at (2M+1) equally-spaced points in time over one temporal period T, the temporal period T being a period of unsteadiness of the periodic fluid flow in the second blade row, $\{\tilde{R}_j\}$ is a vector of flux variables at the (2M+1) equally-spaced points in time over the one temporal period T, and $$\omega = \frac{2\pi}{T}.$$

13. The computer-implemented method of claim 12, wherein the introducing of the pseudo-time term into the modified form of the transformed governing flow equations yields the form of the equations capable of being solved using the steady-state solution method:

$$\frac{\partial \{\tilde{Q}'_j\}}{\partial \tau} + [P]\{\tilde{Q}'_j\} + \{\tilde{R}_j\} = \{0\},$$

where $$\frac{\partial \{\tilde{Q}'_j\}}{\partial \tau}$$

is the pseudo-time term including a fictitious time $\tau$ used to march the solution to a steady state by driving the pseudo-time term to zero.

14. The computer-implemented method of claim 1, wherein the imposing of the wake profile from the first blade row on the second blade row is performed as part of a frozen gust analysis.

15. The computer-implemented method of claim 1, wherein the modified form of the transformed governing flow equations comprises a hybrid form including terms in a time domain and terms in a frequency domain.

16. The computer-implemented method of claim 1, wherein the wake profile is imposed on an inlet of the second blade row.

17. The computer-implemented method of claim 1, wherein the first blade row is an upstream blade row of the turbomachine, and wherein the second blade row is a downstream blade row of the turbomachine.

18. The computer-implemented method of claim 1, wherein the wake profile comprises hot streaks of gases.

19. A system for modeling fluid flow in a blade row of a turbomachine, the system comprising:
a processing system; and
a memory in communication with the processing system, wherein the processing system is configured to execute steps comprising:
receiving a specification of a system including a first blade row and a second blade row of a turbomachine;
imposing a wake profile from the first blade row on the second blade row to approximate an influence of the first blade row on the second blade row, the imposing of the wake profile enabling a fluid flow in the second blade row to be solved without modeling the first blade row, the wake profile being periodic at a known frequency;
calculating an inclination parameter based on a pitch difference between the imposed wake profile and a modeled blade passage of the second blade row, wherein the fluid flow in the second blade row is governed by time-transformed governing flow equations based on the inclination parameter;
representing flow variables of the time-transformed governing flow equations according to a Fourier series with spatially-varying Fourier coefficients and a fundamental frequency equal to the known frequency, wherein a modified form of the time-transformed governing flow equations that represents a uniform sampling within a period of the fundamental frequency, the modified form of the time-transformed governing flow equations corresponding to the governing flow equations modified based on the representation of the flow variables;
introducing a pseudo-time term into the modified form of the time-transformed governing flow equations including a pseudo-time term, the pseudo-time term causing the equations to have a form capable of being solved using a steady-state solution method; and
solving the modified form of the time-transformed governing flow equations using the steady-state solution method to model the fluid flow in the second blade row.

20. A non-transitory computer-readable storage medium for modeling fluid flow in a blade row of a turbomachine, the computer-readable storage medium comprising computer-executable instructions which, when executed, cause a processing system to execute steps comprising:
receiving a specification of a system including a first blade row and a second blade row of a turbomachine;
imposing a wake profile from the first blade row on the second blade row to approximate an influence of the first blade row on the second blade row, the imposing of the wake profile enabling a fluid flow in the second blade row to be solved without modeling the first blade row, the wake profile being periodic at a known frequency;
calculating an inclination parameter based on a pitch difference between the imposed wake profile and a modeled blade passage of the second blade row, wherein the fluid flow in the second blade row is governed by time-transformed governing flow equations based on the inclination parameter;
representing flow variables of the time-transformed governing flow equations according to a Fourier series with spatially-varying Fourier coefficients and a fundamental frequency equal to the known frequency, wherein a modified form of the time-transformed governing flow equations that represents a uniform sampling within a period of the fundamental frequency, the modified form of the time-transformed governing flow equations corresponding to the governing flow equations modified based on the representation of the flow variables;

the modified form of the time-transformed governing flow equations including a pseudo-time term, the pseudo-time term causing the modified form of the time-transformed governing flow equations to have a form capable of being solved using a steady-state solution method; and solving the modified form of the time-transformed governing flow equations using the steady-state solution method to model the fluid flow in the second blade row.

\* \* \* \* \*